July 21, 1964   B. EDWARDS   3,141,913
METHOD OF MAKING A CONTAINER
Filed Dec. 10, 1959   4 Sheets-Sheet 1

INVENTOR.
Bryant Edwards
BY
Olson & Trexler
attys.

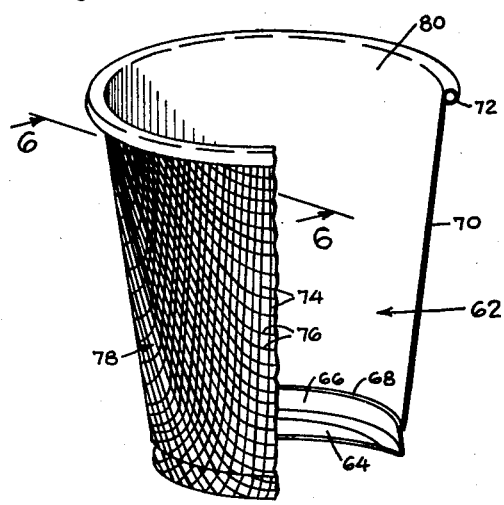
Fig. 5
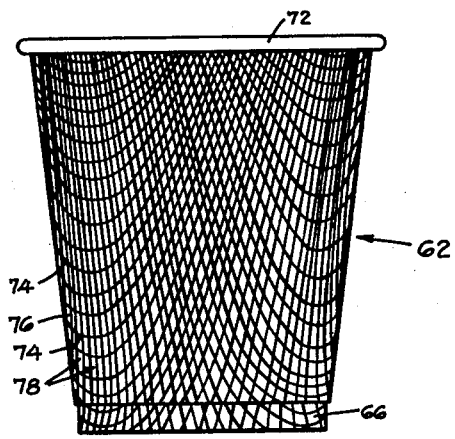
Fig. 6
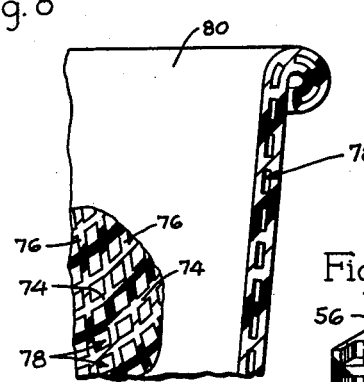
Fig. 8
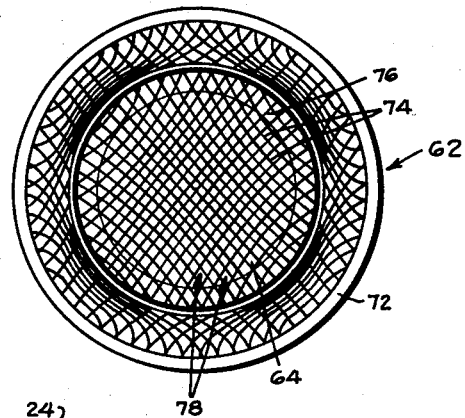
Fig. 7
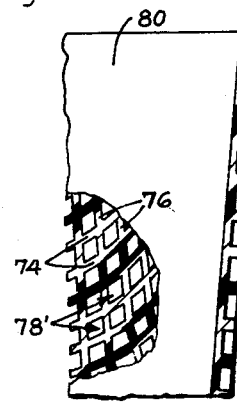
Fig. 10
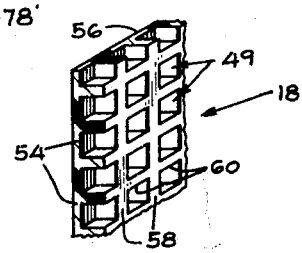
Fig. 9
Fig. 11
INVENTOR.
Bryant Edwards
BY
Olson & Trexler
attys.

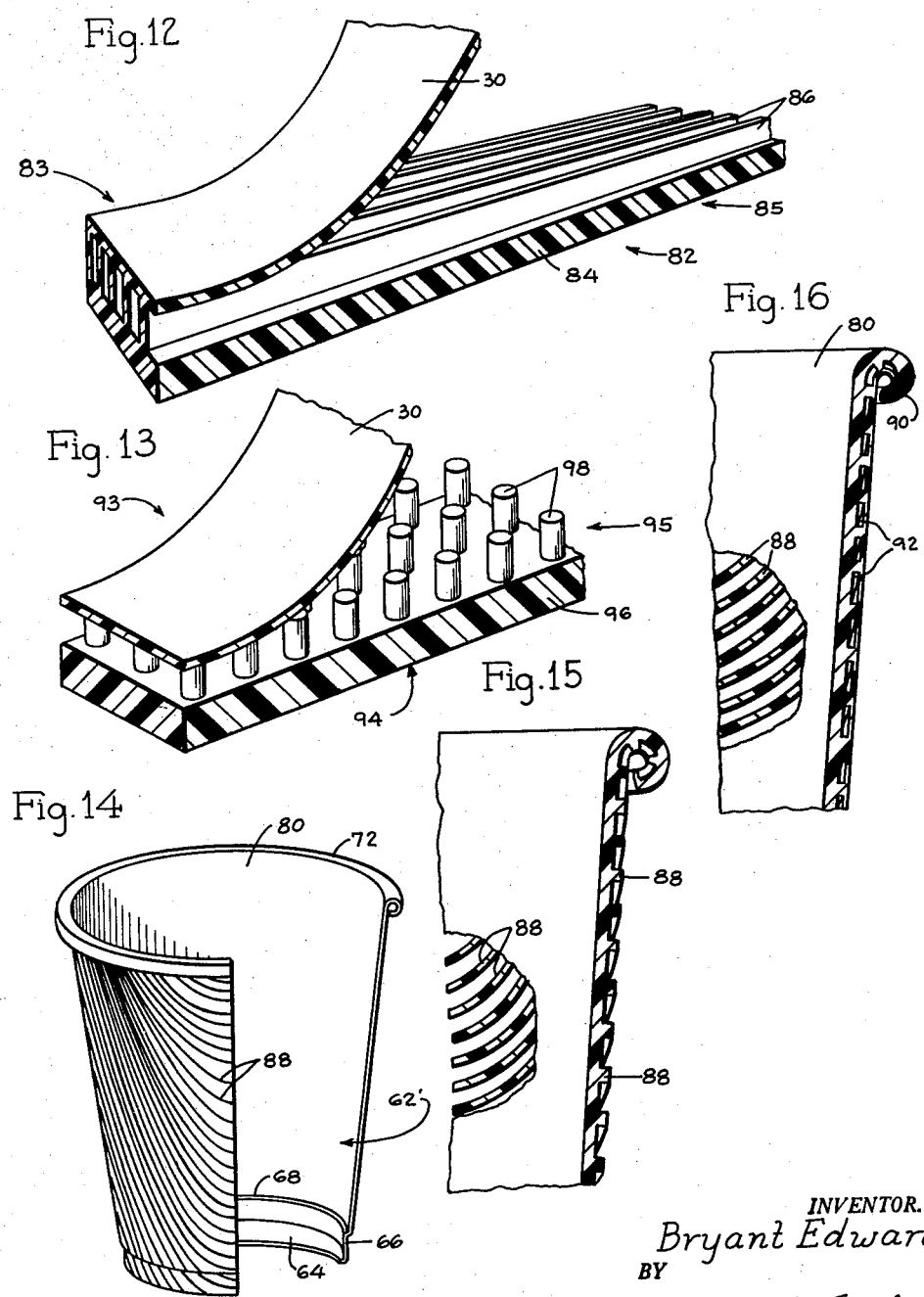

July 21, 1964   B. EDWARDS   3,141,913
METHOD OF MAKING A CONTAINER
Filed Dec. 10, 1959   4 Sheets-Sheet 4
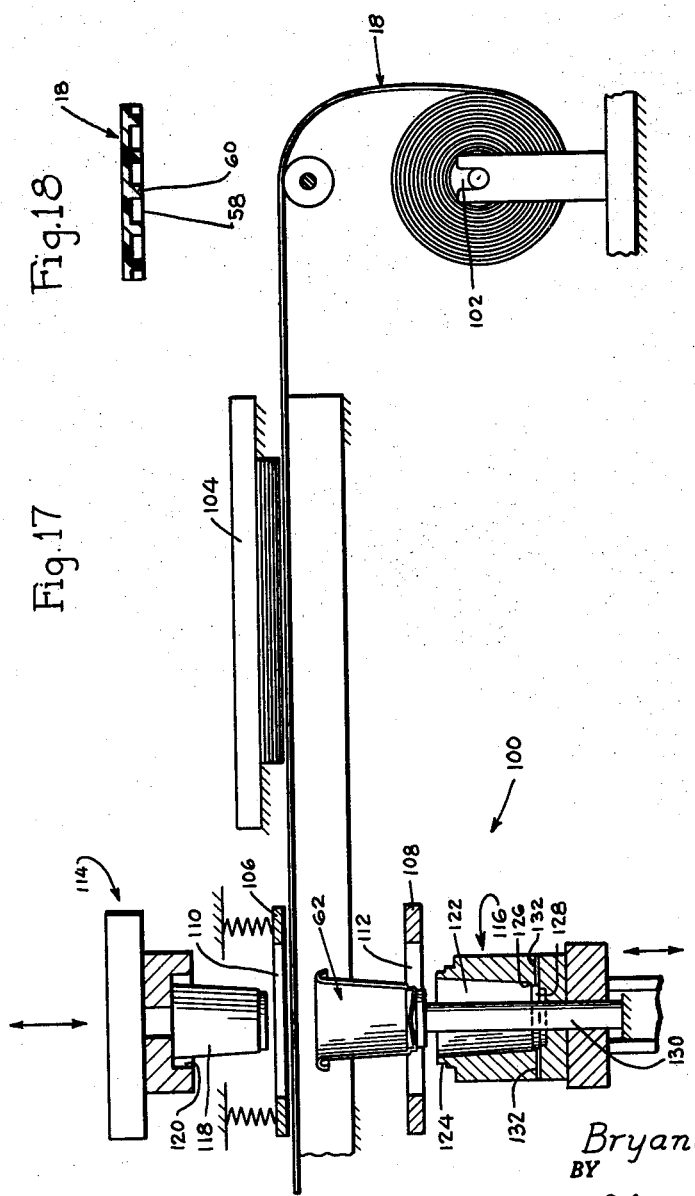
INVENTOR.
Bryant Edwards
BY
Olson & Trexler
attys.

United States Patent Office 3,141,913
Patented July 21, 1964

3,141,913
METHOD OF MAKING A CONTAINER
Bryant Edwards, Oak Park, Ill., assignor to Illinois Tool
Works Inc., a corporation of Delaware
Filed Dec. 10, 1959, Ser. No. 858,792
10 Claims. (Cl. 264—210)

This invention relates in general to containers, and more particularly relates to plastic containers which are of the thin wall variety, and the materials and methods by which the container is made.

It has long been desired to have an economical plastic container for use with hot beverages, foods, etc. and of the type wherein the user is not subjected to discomfort from heat transfer of a hot beverage disposed within the container.

It is therefore the general object of this invention to provide a plastic container which, when filled with hot beverages, may be readily manually grasped without discomfort to the user while drinking from or carrying the container.

Another object of this invention is to provide an economical plastic container of the aforementioned type which may be stacked and readily dispensed from a vending machine, being comparable in weight to present cup designs.

It is another object of this invention to provide a unitary plastic container which is unaffected by humidity and thus is dimensionally stable for easy vending, is uniform in size when manufactured by mass production techniques, and is otherwise well adapted to be automatically vended from the vending machines now in use.

It is another object of this invention to provide a container as above described which is strong per unit of weight, has no seams to disintegrate when filled with a hot beverage, and has a configuration affording insulating characteristics such that it may be readily held by user when the temperature of the beverages contained therein are well above the temperature that the human hand can normally withstand.

It is a further object of this invention to provide a novel container as set forth above which protects table surfaces, etc. from heat transfer, and additionally, the very low moisture vapor transmission of the material protects the table surface, etc. from marking by the beverages contained therewithin.

Another object of this invention is to provide a container comparable in weight to containers heretofore known, but wherein the formed material affords a greatly increased apparent thickness of the container to thereby insulate the user from the temperature of the contents in the container.

Another object of the invention is to provide a container as aforedescribed which is made of similar base material to prior art containers but, due to configuration of materials, is stronger per unit of weight than containers known heretofore.

It is a further object of this invention to premold the web stock normally used in molding the containers whereby the apparent thickness of the material is increased without increasing the weight or the amount of material that is used.

It is a further object of this invention to provide a container forming method wherein the material is pre-molded and of such characteristics that the scrap from the molding machine may be readily reground and reconstituted for re-use in the molding machine without expensive degassing techniques.

Another object of this invention is to provide a novel material which is pre-molded into a preselected configuration prior to being fed into a container molding machine such that a structurally strong article of manufacture is obtained in the final molding process without loss of identity of the pre-molded configuration.

Other objects and advantages of the present invention will appear from the following description in the accompanying drawings wherein:

FIG. 5 is an isometric perspective view, a portion being in section, illustrating somewhat diagrammatically a container embodying principles of this inventon;

FIG. 6 is a side view of the container shown in FIG. 5;

FIG. 7 is a bottom view of the container shown in FIG. 6;

FIG. 8 is an enlarged fragmentary sectional view of the upper portion of a container such as shown in FIG. 5 when made of the materials shown in FIG. 9;

FIG. 9 is a fragmentary isometric perspective view of the material used in making the container shown in FIG. 8;

FIG. 10 is a view similar to FIG. 8 when utilizing the materials shown in FIG. 11;

FIG. 11 is a fragmentary isometric perspective view of the material used in manufacturing the article shown in FIG. 10;

FIG. 12 is an isometric perspective view of an alternate type of material being manufactured by the general process shown in FIG. 2;

FIG. 13 is a view similar to FIG. 12 of still another type of material usable in making containers embodying the inventive concepts;

FIG. 14 is a semi-diagrammatic isometric perspective view, a portion being in section, indicating diagrammatically the form of a container that is obtained when the material shown in FIG. 12 is used;

FIG. 15 is a fragmentary sectional view of an upper portion of the container shown in FIG. 14 when a portion of the material shown in FIG. 12 is used in a non-laminated form;

FIG. 16 is a view similar to FIG. 15 showing the upper portion of the container when a laminated material such as shown in FIG. 12 is utilized;

FIG. 17 is a semi-diagramatic view of the apparatus utilized in the preferred method of molding containers from the materials shown in the earlier figures; and FIG. 18 is a fragmentary enlarged cross-sectional view of the material used in forming the container in the position it would assume as it is moved toward the molding apparatus.

Figure 1:
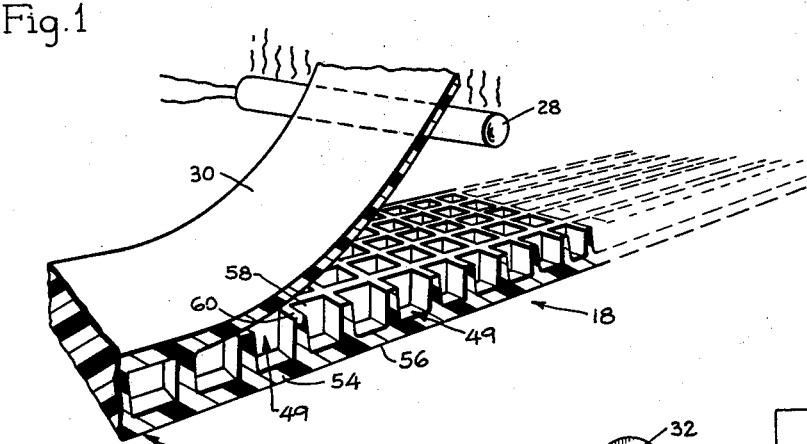
FIG. 1 is a fragmentary perspective view of a portion of the apparatus and materials being made by the process shown in FIG. 2.

Before discussing the invention in detail some general background would appear beneficial. Plastic containers have begun to come into general use with automatic vending machines and (particularly when associated with hot beverages such as coffee, soup, etc.) present a handling or holding problem to the user when the beverage is served hot.

Most of the plastics used in manufacturing these containers have fairly good insulating characteristics per unit thickness when compared with other materials. However, in the interests of economical manufacture of plastic containers to compete successfully with other materials, relatively thin walls are required, since raw plastic material is uniformly sold on a per pound basis, and increasing of the amount of thickness of the material to increase the insulating qualities would merely increase the unit price of a plastic container to make it noncompetitive. One approach to the problem has been to try to extend the plastic material by "foaming," i.e., creating bubbles of gas in the plastic materials, and manufacturing a container of such foam material or manufacturing a laminate of foamed material to a thin web of non-foamed material. This approach to date has not proved successful in terms of acceptable containers at a competitive price to containers made from other materials. Further, laminated foam and sheet stock pose great problems in reconstituting the scrap materials. Also, solid foam containers present a product having a non-smooth interior surface which traps the particles in suspension in the beverage or the like served in the container which is undesirable from a user's standpoint.

In my co-pending application entitled Nestable Cup, filed October 29, 1958, and having Serial Number 769,-057, now Pat. No. 3,091,360. I have disclosed a machine and method for manufacturing thin wall containers by a technique which includes the use of a combination of mechanical plug-assist and pressure differentials. While the instant invention has special advantages when made through the use of molding techniques, it will be appreciated that it also has advantages relative to the other forming techniques now in use such as vacuum forming, blow forming, drape forming, and the like.

More particularly, I have developed a new material, in the sense that I increase the apparent thickness of the material prior to the container molding stage by premolding, preferably in a continuous manner, a plurality of closely spaced projections on a web of plastic material. This material may then be used "as is" in the container molding operation or a thin sheet may be laminated to the end portions of the projections. If the projections are configured correctly, not only is the apparent thickness of the finally formed container increased, but in addition, the projections serve to structurally increase the strength and rigidity of the container affording an even further benefit in the weight vs. strength ratio.

The molding of the container with my premolded material utilizes the general techniques taught in the aforementioned co-pending application with certain modifications. These modifications do not change the basic procedure, however, they do aid in providing a better container with certain of the materials as will be discussed hereinafter.

Figure 2:
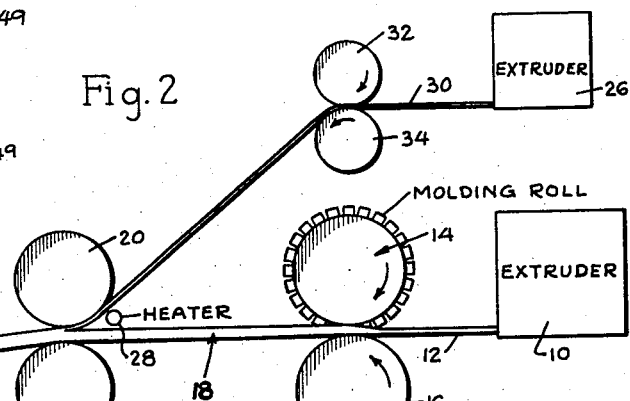
FIG. 2 is a semi-diagrammatic showing of the components of apparatus used in manufacturing the materials shown in FIG. 1.

Returning now to FIG. 2 of the drawings, a first extruder 10 of conventional design is shown diagrammatically in the lower right hand portion of FIG. 2 and is adapted to extrude a uniform web of thin plastic material 12 having a predetermined thickness and width. In the illustration to be described, the plastic material is preferably polystyrene or a similar type of thermo-plastic material. The web 12 is fed between a smooth roll 16 and a molding roll 14 (to be later discussed in detail) from which it emerges in the form which is shown in FIG. 1 and identified with the reference numeral 18. It should be noted that neither the width nor length of the material is increased, but the apparent thickness is greatly increased. The material 18 is then either used "as is" or fed between two laminating rolls 20 and 22 and emerges as a laminated material 24 on the output side of the rolls 20 and 22. In the event that laminated material is desired, material which is to be laminated to the premolded material 18 may be conveniently extruded from a second extruder 26. The web 30 passes between two rolls 32 and 34 which locate the web 30 for feeding to the area between the laminating rolls 20 and 22. The web material 30 and the premolded material 18 are heated by a suitable heater 28 immediately adjacent the input side of the laminating rolls 20 and 22 so as to prepare the surfaces thereof sufficiently to obtain good cohesive bond therebetween in the finally produced material 24. Heater 28 may be an electrical resistance type of heater of any commercially known type or other suitable equivalent type heater, the main purpose being to soften the mating surfaces only, of the material 30 and the premolded material 18. The premolded material 18, or the laminated material 24, as it is received from the laminating rolls 20 and 22, may be wound on a suitable storage roll or may be fed directly into a container molding machine (shown diagrammatically in FIG. 17) as suitable and desired.

Figure 3:
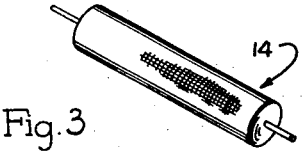
FIG. 3 is an isometric perspective view of the continuous molding roll used in the apparatus shown in FIG. 2.
Figure 4:
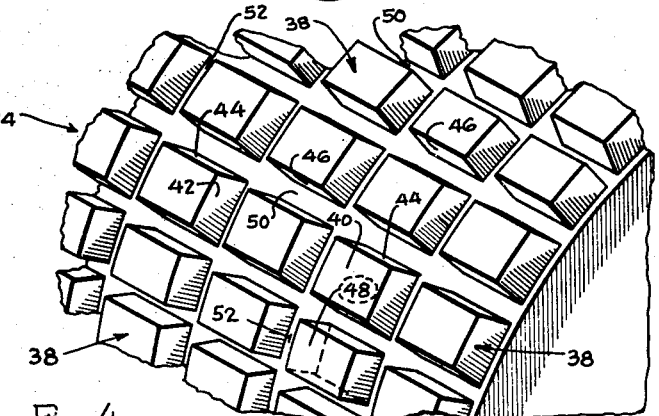
FIG. 4 is an enlarged fragmentary sectional view of a portion of the roll shown in FIG. 3.

The continuous molding roll 14 is shown in an enlarged fragmentary sectional view FIG. 4 and shown in perspective in FIG. 3. The molding roll 14 is generally cylindrical and on the outer surface of the periphery are a plurality of projecting lugs 38. Each of the lugs 38 have a generally planar rectangular end surface 40 and four tapering side walls 42, 44, 46 and 48 which taper inwardly in converging relation as they project from the surface of the roll 14. The individual lugs 38 may conveniently be formed by cutting away material from a cylinder to form a plurality axially aligned longitudinal grooves 50 and transverse circumferential grooves 52. It will be appreciated that the fragmentary sectional view FIG. 4 is considerably enlarged for purposes of clarity as are the certain other views in these drawings inasmuch as it is intended that the individual lugs project from the surface on the order of five- to fifty-thousandths of an inch. It will be further appreciated that the material 12, material 18, and material 24 are all measured in terms of thousandths of an inch and that the final dimension of the thickness of the side walls of the container 62 used for illustration, would not generally exceed sixty-thousandths of an inch.

The molding roll 14 as it impinges upon the material 12 as it comes from the extruder 10 (in heated condition), continuously molds a plurality of pockets 49 which are complementary in shape to the shape of the lugs 38. It should be noted at this time that extreme care must be exercised so that the lugs 38 on the molding roll do not have any sharp burs or "wire edges" so as to tear the corners of the pockets 49 when the molding lugs 38 are withdrawn from the material as it passes thereby.

As shown in FIG. 1, the material 18 as it leaves the molding roll 14 has a smooth bottom surface 56 on one side of a base portion 54 and a plurality of projecting cross connecting webs 58 and 60 which correspond respectively to the valleys or grooves 52 and 50 in the molding roll 14. It will be noted that this premolding operation by the molding roll 14 increases the apparent thickness of the material as is shown by the relative thickness of the material 12 before it passes roll 14 and the thickness of material 18 after passing roll 14, best seen in FIG. 2 of the drawings. It is preferred that the preformed material 18, in cross section, presents web members 58 and 60 which are not less in height than the bottom wall or base portion 54 is in thickness. The molding roll 14 is mounted relative to roll 16 and the material 12, and the configurations and proportions of the lugs 38 on roll 14 are so arranged, that the material displaced by the lugs fills up the grooves 50 and 52 and the top surface of the cross webs 58 and 60 are parallel with planar surface 56 of the base portion 54.

The material above described, either in laminated form as shown and identified by the reference numeral 24, or when used in sheet form without the laminated element, as shown and identified by reference numeral 18, is particularly well suited for the manufacture of containers such as 62 as shown in FIGS. 5, 6 and 7. While I have elected to show a container in the form of a cup, it must be realized that the instant invention is adapted for other uses in molded plastic items and it is not to be limited to the precise article shown.

In container manufacturing of the variety set forth in my co-pending application aforementioned, it is the practice to feed .030 inch web stock into the molding apparatus and the container side walls, after molding, are in the neighborhood of .012 inch in thickness. Using the same starting thickness (and weight) of the material 12 (.030 inch) as it comes from the extruder 10, and then passing it through the molding roll 14, it is relatively easy to increase the apparent thickness thereof such that the material 18 (unlaminated form) is .060 inch in apparent thickness. This .060 inch material then is reduced to the neighborhood of .024 side wall thickness in the finished container in the molding operation. However, the unit weight of the container remains the same as the unmodified material now in use. (The same proportions may be used in laminated form.)

The container thus formed from my premolded material, while weighing the same as containers produced heretofore, is much stronger due to the reinforcing action of the webs as shall become apparent. Thus the increase in apparent thickness enhances not only the installation characteristics, but also increases the strength on a unit weight basis. Further, due to the increase in apparent thickness, the stacking and vending problems of the containers are enhanced. The increase in apparent thickness increases the interference of special stacking rings where used, and under some circumstances allows elimination thereof.

Turning now to the container shown, the container 62 is generally cylindrical in shape having a bottom portion 64, a short skirt portion 66, a radial shoulder 68 and side walls 70 which taper outwardly to a lip portion 72. The lines 74 and 76 are semi-diagrammatic representations of the transformation of the cross webs 58 and 60 which define the pockets 49 in materials 18 and 24 as they are distorted to form new pockets 78 in the container molding operation by the method and apparatus shown semi-diagrammatically in FIG. 17.

It will be noted by referring to the enlarged fragmentary sectional views on FIGS. 8 and 10 respectively that the ribs or webs 56 and 58 of the materials 18 and 24 are stretched out proportionately with the thinning down of the other portions of the material when the container is formed in the container molding operation. In practice, there are in the neighborhood of two times as many struts or webs 74 and 76 as are shown in FIGS. 5–7. It will be appreciated that each of the individual pockets 78 have the premolded forms shown respectively as 49 in FIGS. 9 and 11 respectively as applied to FIGS. 8 and 10.

Figure 1A:
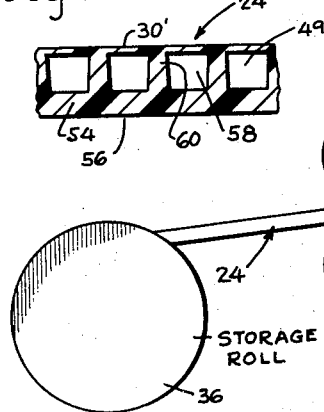
FIG. 1a is a fragmentary sectional view of the material shown in FIG. 1.

The material 18 (shown in FIG. 11), when used to form a container 62, produces one having the outside appearance of a grid-like network of projecting interconnecting web members 74 and 76. The inside surface of the container 80 is relatively smooth. Further, the outer surface of container 62, when manufactured from material 18 and when grasped by a user on the outside thereof, is such that the fingers of the user will be separated from the interior 80 by the dimension of the base portion 54 and by the thickness of the projecting portions 74 and 76. The ribs or webs 74–76 are relatively closely spaced so as to prevent direct contact by the fingers of the user with the base portion 54. Similar statements are true relative to the material 24 used in the manufacture of the articles shown in FIG. 8 except that there is an additional thickness of material 30 or 30' which has been laminated to the end portions of the projecting struts or webs. As shown in FIG. 1a, the material 30' may be very thin stock and substantially less than the thickness of the base portion 54. When this form of material is used in the relative dimensions stated, care must be taken to mold the container 62 so that the surface 56 becomes the surface 80 of the container.

Another embodiment of material 82 is shown in FIG. 12 of the drawings. This material is essentially similar to that aforediscussed except that the cross or longitudinal ribs 60 have been eliminated and again this material may be used in the laminated form 83 or unlaminated form 85. More particularly, the material 82 comprises a base material which has been premolded by a roll similar to roll 14 so as to have projecting lugs 86. A web of material 30 may be laminated to the top portions of the lugs 86 if desired to provide the laminated form. As shown in FIG. 14, the material 82 when used to make a container 62 by the apparatus and method shown in FIG. 17 will assume a configuration as shown, and the lines 88 are semi-diagrammatic representations of the distortion of the individual projecting lugs 86 of the material 82. When material 82 is used in the laminated form (as shown in FIG. 16) it should be noted that the preferred method of molding the container assures that individual elongated compartments or pockets 92 are created by the lip 90 being pinched off in the molding operation (to be later described). By this method each pocket 92 between each pair of projecting ribs 88 is separated from adjacent pockets and from the atmosphere. The non-laminated material 85 when molded into a container, a portion being shown in FIG. 15, is essentially similar to that shown in FIG. 11 with the elimination of the cross web member 76. Due to the configuration, the webs 88 necessarily strengthen the container on a weight to strength ratio. Further, it is possible to have a lesser amount of material in the container as compared to using material 18 with only a slight loss in rigidity. The close spacing of the ribs 88 prevents contact of the users' fingers with the base portion of the material to increase the apparent thickness of the material.

Another type of material 94, usable in molding containers to increase the apparent thickness thereof, is shown in FIG. 13 and comprises a base portion 96 having cylindrical projecting lugs 98 which may be used as is in form 95 or may have a thin web 30 laminated to the tops of the projections 98 as shown to form material 93. The lugs 98 increase the apparent thickness of the material 95. Obviously, since the lugs 98 are not interconnected, the strength advantage noted in previous forms is not as great. In the laminated form, the material has been demonstrated to be quite strong per unit weight. When molded into a container, the lugs 98 assume positions on the container corresponding to the points of intersection of the cross webs 74–76 of container 62.

As shown in FIG. 17, the preferred method of molding is essentially that taught in my co-pending application aforementioned. I have elected to show the material 18 (unlaminated material) shown in FIG. 1 of the drawings to illustrate the container molding operation. The apparatus 100 essentially comprises a storage roll 102 having material 18 wound thereon which is fed past a suitable heating means 104 into the molding apparatus per se wherein it is engaged on the upper and lower sides by an upper and lower clamp means 106 and 108. It will be noted that each of the clamp means 106 and 108 has an aperture 110 and 112 respectively, which are larger than the mold means 114 and mandrel means 116. The mold means 114 essentially comprises a male mandrel or plug member 118 and around the top portion thereof is a combination clamp and cut-off means 120 which is discussed in detail in my co-pending application aforementioned. The mold 116 is essentially frusto-conical in configuration, and comprises side walls 122, a short radial shoulder 126, a short skirt portion and a knock-out plug 130, the head of which is adapted, during the molding operation per se to be the bottom of the mold cavity. Of special not are the bleed ports 132 which are placed adjacent the bottom of the short skirt portion 128. It will be noted that there are no other bleed ports in the side walls 122.

In operation, the material 18 is clamped by the opposed clamping means 106-108, and the mold means 116 and mandrel means 114 are moved into telescoped relation, mechanically drawing the material down into the mold cavity. Thereafter, an air pressure differential is created so as to move the web from contact with portions of the mandrel member 118 to the mold side walls 122. At this time air is trapped between the shoulder 126 and the clamping edges of the mold lip 124 and the cut-off and clamp means 120 on the mold 118 so as to provide a resilient back pressure on the material adjacent the side walls 122 preventing the flattening out of the projecting web portions 58 and 60 of the material 18 during the molding operation. Since the pressure differentials across the web created in container molding operations of this kind are rather severe, without the shoulder edge 126 adjacent the skirt portion 128 and the clamping of the container around the periphery at the lip, the projecting portions 58 and 60 (and 86) would have a tendency to be crushed and thereby reduce the advantages of the premolding operation.

It will be noted that the material 18 is fed into the machine so that the projecting portions 58-60 (also true of projections 86 and 98) are those portions that engage the cavity side walls 122 in the molding operation. When molding a container with laminated material, it is not necessary to orientate the material if the web 30 is of the same thickness as the base portion of the material.

While I have shown and described certain embodiments of the invention in detail, it is with full awareness that many modifications thereof can occur and the scope of the invention, therefore, is to be construed only in the light of the prior art and the spirit of the appended claims.

The invention is claimed as follows:

1. The method of making containers from an extruded web of plastic material comprising feeding a web of heated sheet thermoplastic material of a first thickness to a forming roll in a manner to localize pressure at spaced points on said web to continuously mold a plurality of interconnected thin projections on one side only of said web to create a greater apparent thickness therein without decrease in width or length of the material, feeding the modified material to a molding machine, reheating the modified material, clamping the material, stretching the clamped material mechanically with a male plug and moving the stretched material into a female mold, creating a positive pressure on the plug side of the material and a resilient back pressure in at least a part of the mold to form a container in the molding machine, said stretching and forming in the molding machine causing only a proportionate decrement in the increased apparent thickness of the material without destruction of the plurality of interconnected thin projections.

2. The method of making containers from an extruded web of plastic material comprising feeding a web of heated sheet thermoplastic material of a first thickness to a forming roll having forming lugs projecting from the surface thereof on the order of .005 to .050 inch to continuously mold a plurality of thin projections on one side only of said web to create a greater apparent thickness therein without decrease in width or length of the material, feeding the modified material with the greater apparent thickness to a molding machine, reheating the modified material, stretching the material mechanically with a plug and subsequently creating a pressure differential in a manner to provide a resilient back pressure to form a container in the molding machine, said stretching in the molding machine causing only a proportionate decrement in the increased apparent thickness of the material without destruction of the plurality of thin projections to provide a light weight seamless container which is strong per unit weight.

3. The method of making containers from an extruded web of plastic material comprising feeding a web of heated sheet thermoplastic material of a first thickness to a forming roll having projections thereon on the order of .050 to .005 inch, said projections being spaced apart a distance less than the height thereof to continuously mold a plurality of interconnected thin projections on one side only of said web to create a greater apparent thickness therein without decrease in width or length of the material, laminating a second web to the projections to form a modified material, feeding the modified material to a molding machine, reheating the modified material, clamping the material, stretching the clamped material mechanically with a male plug and moving the stretched material into a female mold, creating a positive pressure on the plug side of the material and a resilient back pressure in at least a part of the mold to form a container in the molding machine, said stretching and forming in the molding machine causing only a proportionate decrement in the increased apparent thickness of the material without destruction of the plurality of interconnected thin projections.

4. The method of making containers from an extruded web of plastic material comprising feeding a web of heated sheet thermoplastic material of a first thickness to a forming roll in a manner to continuously localize pressure at spaced points on said web to thereby mold a plurality of thin projections on one side only of said web to provide a greater apparent thickness therein without decrease in width or length of the material, feeding the modified material to a molding machine, reheating the modified material, stretching the material mechanically with a plug and thereafter providing a pressure differential to form a container in the molding machine, said stretching in the molding machine by the pressure differential including a resilient back pressure causing only a proportionate decrement in the increased apparent thickness of the material without destruction of the plurality of thin projections.

5. The method set forth in claim 4 wherein the thin projections are interconnected to form a grid-like network.

6. The method set forth in claim 4 wherein the thin projections extend longitudinally in the direction of the moving web.

7. The method set forth in claim 4 wherein the thin projections are cylindrical in form.

8. The method set forth in claim 4 wherein a second web is laminated to the projections of the first web prior to the stretching thereof.

9. The method of making containers from an extruded web of plastic material comprising modifying a web of sheet thermoplastic material of a first thickness by forming a plurality of projecting portions integral with said web to provide a greater apparent thickness therein without decrease in width or length of the material, feeding the modified material to a molding machine and forming a container in the molding machine by stretching portions of the material away from the plane of the web against a resilient back pressure to thereby retain the increased apparent thickness of the material.

10. The method of making containers from an extruded web of plastic material comprising the steps of modifying a web of sheet thermoplastic material of a first thickness by forming a plurality of projecting portions integral with said web to provide a greater apparent thickness therein without decrease in width or length of the material, feeding the modified material to a molding machine and then forming a container in the molding machine by stretching portions of the material away from the plane of the web against a resilient back pressure to thereby retain the increased apparent thickness of the material.

References Cited in the file of this patent

UNITED STATES PATENTS

| | | |
|---|---|---|
| 1,934,798 | Gelstharp | Nov. 14, 1933 |
| 1,988,787 | Fowler | Jan. 22, 1935 |
| 2,422,998 | Adams et al. | June 24, 1947 |
| 2,444,420 | Borkland | July 6, 1948 |
| 2,531,540 | Smith | Nov. 28, 1950 |
| 2,660,761 | Peters | Dec. 1, 1953 |
| 2,719,564 | Schneider | Oct. 4, 1955 |
| 2,797,179 | Reynolds | June 25, 1957 |
| 2,815,161 | Kramer | Dec. 3, 1957 |
| 2,853,222 | Gallagher | Sept. 23, 1958 |
| 2,856,323 | Gordon | Oct. 14, 1958 |
| 2,891,280 | Politis | June 23, 1959 |
| 2,911,681 | Distler | Nov. 10, 1959 |
| 2,917,217 | Sisson | Dec. 15, 1959 |
| 2,942,301 | Price et al. | June 28, 1960 |
| 3,024,154 | Singleton et al. | Mar. 6, 1962 |